United States Patent [19]

Cramer

[11] Patent Number: 5,224,306
[45] Date of Patent: Jul. 6, 1993

[54] ENCLOSURE ASSEMBLY

[75] Inventor: George O. Cramer, Grosse Pointe Woods, Mich.

[73] Assignee: Gallagher-Kaiser Corporation, Detroit, Mich.

[21] Appl. No.: 790,570

[22] Filed: Nov. 13, 1991

[51] Int. Cl.$^5$ .......................................... E04H 15/34
[52] U.S. Cl. ........................................ 52/63; 52/222; 47/17; 24/462; 135/97; 135/101
[58] Field of Search ................... 52/63, 81, 222, 202, 52/81.2, 81.3; 135/97, 101; 47/17; 160/380, 392, 395; 24/462

[56] References Cited

U.S. PATENT DOCUMENTS

| | | | |
|---|---|---|---|
| 2,567,743 | 11/1951 | Stafford et al. | 160/380 |
| 4,189,880 | 2/1980 | Ballin | 52/202 |
| 4,231,141 | 11/1980 | Derrick et al. | 160/380 X |
| 4,233,790 | 11/1980 | Meadows | 52/202 X |
| 4,261,144 | 4/1981 | Rizzo | 52/63 |
| 4,566,236 | 1/1986 | Pound | 52/63 X |
| 4,665,670 | 5/1987 | van den Burg | 52/222 |
| 4,694,543 | 9/1987 | Conley | 52/63 X |
| 4,759,087 | 7/1988 | Zeilinger | 24/462 X |
| 4,817,655 | 4/1989 | Brooks | 52/222 X |
| 4,860,778 | 8/1989 | Pohl | 135/97 |
| 4,926,605 | 5/1990 | Milliken et al. | 52/222 X |
| 5,044,131 | 9/1991 | Fisher | 52/222 X |
| 5,076,033 | 12/1991 | Patsy | 52/222 |

Primary Examiner—Carl D. Friedman
Assistant Examiner—Robert Canfield
Attorney, Agent, or Firm—Reising, Ethington, Barnard, Perry & Milton

[57] ABSTRACT

A clean environment enclosure assembly (10) prevents contaminants from reaching unfinished products during the manufacturing process. The clean environment enclosure assembly (10) includes a plurality of frames (16) which are secured to each other using various shaped brackets (60, 62, 64) to form a structural frame. Sheets of plastic (22) extend across each of the plurality of frames (16) to complete the housing (14). The sheets of plastic (22) are secured to side members (18) of the frames (16) by elongated caps (24) which run the length of the side members (18). The caps (24) have two arms (30, 32) which engage the two substantially parallel side walls (42) of the side members (18) wherein detents (38, 40) of the two arms (30, 32) engage indents (44, 46) of the parallel side walls (42) preventing the cap (24) from freely disengaging the side member (18). The sheets of plastic (22) are sandwiched between the cap (24) and the side members (18).

12 Claims, 2 Drawing Sheets

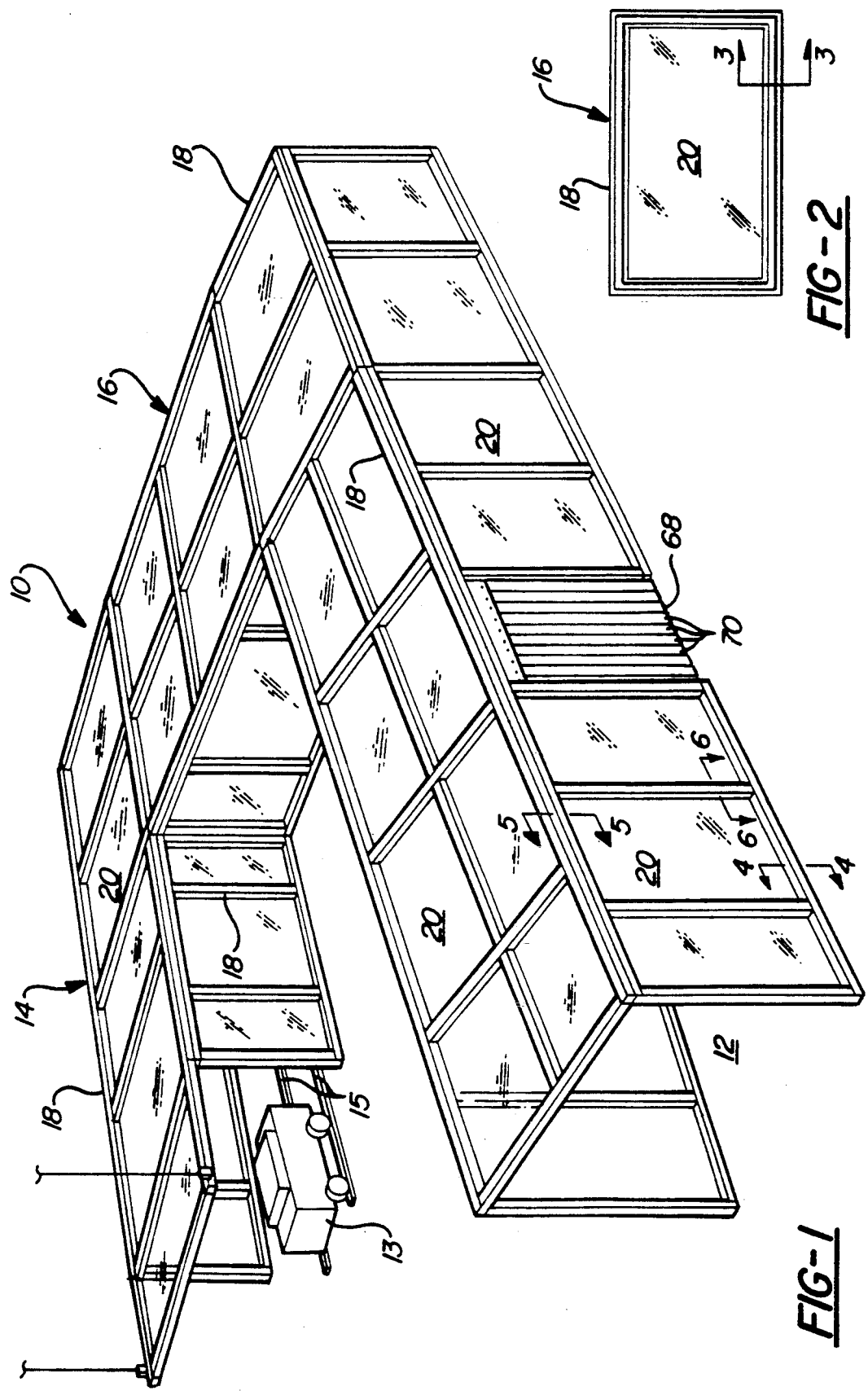

ENCLOSURE ASSEMBLY

BACKGROUND OF THE INVENTION

1. Technical Field

The subject invention relates to enclosures. More particularly, the subject invention relates to enclosures including a plurality of sectional coverings.

2. Description of Related Art

Quality control in the automotive industry is continually reaching new heights. Every aspect of the manufacturing of an automotive vehicle is under close scrutiny. A problem relating to the exterior finishes of the vehicles in the plant environment is the transportation of the vehicle through the manufacturing plant between stages of manufacturing. For example, the exterior finish of a vehicle might become contaminated when the vehicle is moved from the spray booth to the oven where it is heat treated.

Enclosures made of sheet metal have been installed between manufacturing stations in plants. These enclosures, however, create additional problems, they being: the inability to view the parts as they move between stations; the need for new lighting systems which must be installed within the enclosure; and the need for new sprinkler systems which must be installed within the enclosures because the existing sprinkler systems are ineffective if a fire should be ignited in an enclosure.

U.S. Pat. No. 4,860,778 to Pohl, issued Aug. 29, 1989, discloses an enclosure made from a plurality of metal frames and plastic extending across each metal frame. The metal frames include a plurality of side members having substantially U-shaped cross sections creating an aperture with inwardly and downwardly extending flanges extending into the aperture. The flanges coact with arms extending down from a cap and secure the plastic therebetween. The metal frames with the plastic covering the area created by the metal frames are attached to each other and sealed to prevent contaminants from entering the protected area. Although the contamination shield eliminates the need for additional lighting and sprinkler systems, the flanges on the side members tend to cut or tear the plastic destroying the contamination-free space.

SUMMARY OF THE INVENTION AND ADVANTAGES

A clean environment enclosure assembly is disclosed for preventing contaminants from entering a predetermined area. The assembly comprises housing means for providing an enclosure. The housing means includes frame means having a plurality of side members defining a predetermined area for providing a structure for the housing means. Each of the plurality of side members has two substantially parallel sides. Plastic means extends between the plurality of side members over the predetermined area for covering the predetermined area. Cap means secures the plastic means to the frame means. The assembly is characterized by each of the two substantially sides including inwardly extending portions extending toward and outwardly extending portions extending back away from the other of the two substantially parallel side walls indent means directed inwardly for securing the cap means and the plastic means to the frame means.

The advantage of the subject invention is that it allows the cap means to be secured to the frame means which secures the plastic means therebetween without tearing or cutting the plastic means on the sharp edges of the substantially parallel sides.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the preferred embodiment of the subject invention;

FIG. 2 is plan view of one frame of the preferred embodiment of the subject invention;

DETAILED DESCRIPTION OF THE DRAWINGS

Figure 3:
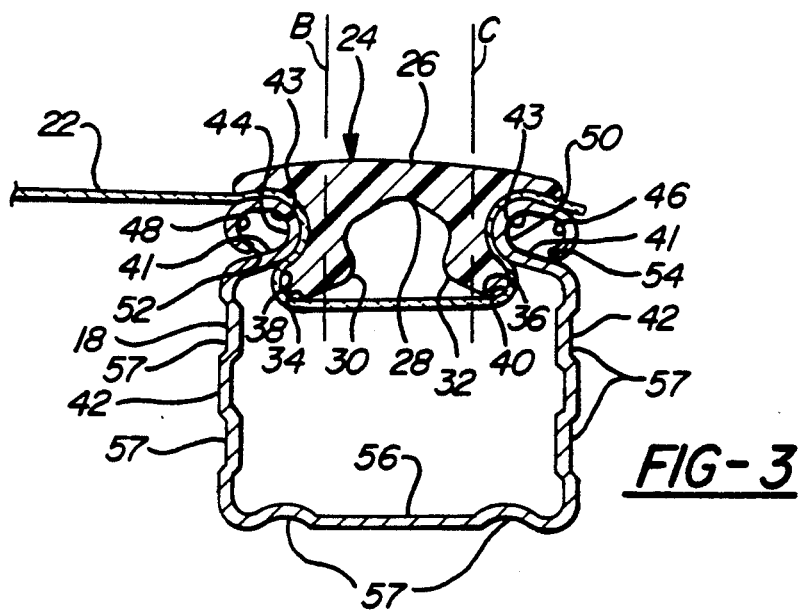
FIG. 3 is a cross-sectional view of a side member taken along line 3—3 in FIG. 2.

As may be seen in FIG. 1, subject invention, generally indicated at 10, is a clean environment enclosure assembly. The clean environment enclosure assembly prevents contaminants from entering a predetermined area 12. The predetermined area 12 typically is an area in a manufacturing facility where parts, shown as a conveyer cart 13 are moved along a conveyor 15 from one location in manufacturing facility to another.

The clean environment enclosure assembly 10 includes housing means, generally shown at 14, for providing an enclosure. The housing means 14 includes frame means, generally shown at 16. The frame means 16 includes a plurality of frames which provide the structure which supports the housing means 14. The frames 16 are fabricated from a plurality of side members 18.

The plurality of side members 18, having a cross section including two substantially parallel side walls 42, discussed subsequently, are joined together in end-to-end fashion to create the frames 16. The plurality of side members 18 may be connected to create any type of polygon as the application requires. Although not shown in FIG. 1, even a combination of polygonal shapes other than rectangles may be used to create the frame means 16.

Plastic means 22 extends between the plurality of side members 18 over the predetermined area 12. The plastic means 22 includes a plurality of plastic sheets, wherein each of the plastic sheets 22 covers the area 20 defined by each of the plurality of frames 16. In the preferred embodiment, the plurality of plastic sheets are transparent. It should be noted, however, that it is not necessary for all of the plurality of plastic sheets 22 to be transparent but only those which would sufficiently provide light into the housing means 14 and allow people to view the entire predetermined area 12.

As may be best seen in FIG. 3, cap means, generally shown at 24, secures the plastic means 22 to the frame means 16. The cap means 24 includes a face 26 and an inner side 28. The cap means 24 include caps for each of the plurality of side members 18. The caps 24 are interchangeable with each of the plurality of the side members 18 so long as the cap 24 is of the same length as the side member 18 to which it is being secured. In other words, the caps 24 are all of the same design, i.e., cross section, but vary in length because the caps 24 extend the entire length of the side member 18 to which it is being attached. Therefore, the length of the side member 18 dictates the length of the cap 24 being attached thereto. This ensures that there are no gaps or holes in the plastic sheets 22 which will maintain the contamination-free environment. The cap 24 further includes two parallel arms 30, 32 having distal ends 34, 36 extending perpendicularly from the inner side 28 of the cap 24. The two parallel arms 30, 32 extend generally along the longitudinal axes B, C, respectively. Securing means 38, 40 are fixedly secured to the distal ends 34, 36 of the two parallel arms 30, 32 for removably locking the cap 24 to each of the plurality of side members 18. More particularly, the securing means 38, 40 secure the cap 24 to indent means 44, 46 (discussed subsequently) wherein the indent means 44, 46 is a part of the two substantially parallel side walls 42 of each of the plurality of side members 18. The securing means 38, 40 comprise a plurality of detents 38, 40 each disposed adjacent to each of the distal ends 34, 36 of the two parallel arms 30, 32.

The assembly 10 is characterized by each of the two substantially parallel side walls 42 including an inwardly extending portion 41 extending toward and an outwardly extending portion 43 extending back away from the each other 42 to define indent means 44, 46 directed inwardly for securing the cap means 24 and the plastic means 22 to the frame means 16. In the preferred embodiment of the subject invention, the indent means 44, 46 comprises an inwardly directed bend in each of the two substantially parallel side walls 42. Said another way, the two substantially parallel side walls 42 of each of the plurality of side members 18 are bent inwardly toward each other to produce the indent means 44, 46. The indent means 44, 46 are located near the distal ends 48, 50 of the two substantially parallel side walls 42, as opposed to being in the middle of or toward the bottom of the two substantially parallel side walls 42, to reduce material costs resulting from the necessity for an enlarged cap means 24 which must extend down past the indent means 44, 46.

The outwardly extending portions 41 of the indent means 44, 46 terminate in rolled ends 52, 54 to prevent tearing of the plastic sheets 22. Other methods to remove the sharp ends of the two substantially parallel side walls 42 from coming in contact with the plastic sheets 22 may be used. Such methods may include, but are not limited to, filing the edges, beading the edges, and the like.

The two substantially parallel side walls 42 of each of the plurality of side members 18 are connected by a cross member 56. The cross member 56 in the preferred embodiment of the subject invention connects the two substantially parallel side walls 42 at the end opposite the rolled ends 52, 54. Therefore, each of the plurality of the side members 18 are substantially U-shaped when viewing the end view of each of the plurality of side members 18.

To add strength to the side members 18, the two substantially parallel side walls 42 and the cross member 56 all include a plurality of ridges 57. These ridges 57 add strength and rigidity to the side members 18.

Figure 4:
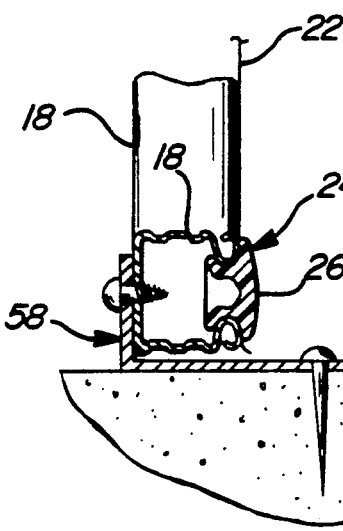
FIG. 4 is a cross-sectional view of a support bracket taken along line 4—4 in FIG. 1.
Figure 5:
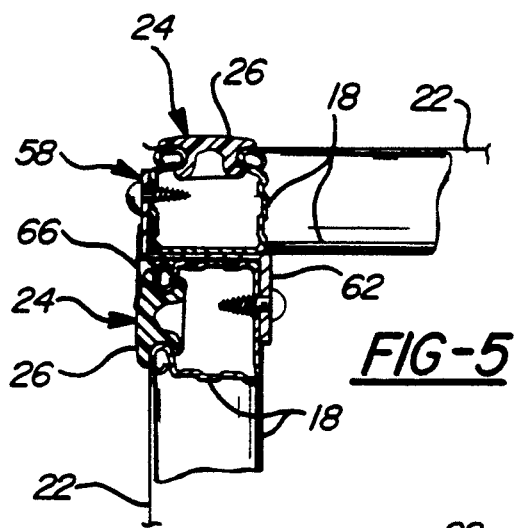
FIG. 5 is a cross-sectional view of a bracket used to secure a horizontal frame to a vertical frame taken along line 5—5.
Figure 6:
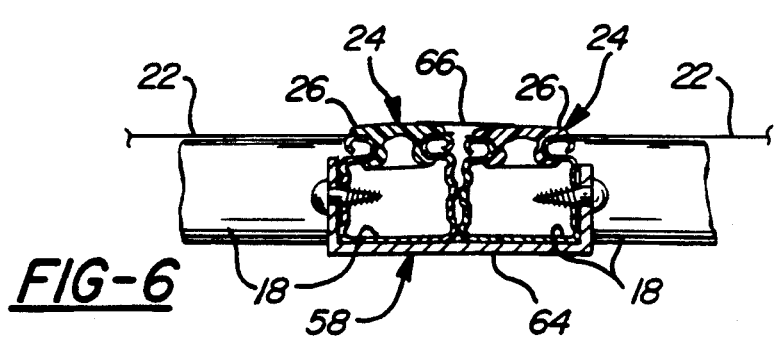
FIG. 6 is a cross-sectional view of a bracket holding together two side members of a preferred embodiment of the subject invention taken along line 6—6 in FIG. 1.

The subject invention 10 further includes attachment means, generally shown at 58, for fixedly attaching the plurality of frames 16 together to form said housing means 14. In FIG. 4, an L-bracket 60 is used to secure the side members 18 to the ground. FIG. 5 shows an S-shaped bracket 62 used for securing two frames 16 which extend in differing planes. Although the S-bracket 62, shown in FIG. 5, connects two frames 16 which are oriented perpendicular to each other, other configurations of the S-bracket 62 may be used when it is necessary for the frames 16 to be connected to each other at angles other than 90°. FIG. 6 represents two side members of two separate frames 16 secured to each other to create a wall. The bracket used is a U-shaped bracket 64 wherein securing screws secure each of the side members 18 to one of the two upwardly extending sides of the U-shaped bracket 64 wherein the two side members 18 are located on the interior of the U-shaped bracket 64.

Sealing means 66 is used for sealing the plurality of frames 16 together such that no contaminants may enter the housing means 14. The sealing means 66 comprises an adhesive tape having a width wherein half of the width of the adhesive tape 66 is secured to one of the plurality of side member 18 used to make one of the plurality of frames 16 and the remaining half of the adhesive tape 66 is secured to another of the plurality of side members 18 used to make another of the plurality of frames 16. The adhesive tape 66 is applied to all the seams between the plurality of frames 16 to insure that no contaminants, such as chemical liquids, paint, shavings, fall through or run through the seams created by the plurality of frames 16. The adhesive tape 66 perfects the adjoining edges of the adjoining frames 16 and continues to perfect that seal even after the side members 18 deform due to use, heat and the usual wear associated with the factory environments.

If desired, a curtain 68 may replace a plurality of the frames 16 to provide access to the housing 14 in an area other than the two ends of the housing 14. The curtain 68 can be a curtain of plastic strips 70 or other such material suitable for the manufacturing environment.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A clean environment enclosure assembly (10) for preventing contaminants from entering a predetermined are (12), said assembly (10) comprising:

housing means (14) for providing an enclosure defining a predetermined area (12), said housing means (14) including frame means (16) for providing a structure, said frame means (16) having a plurality of side members (18) each of said plurality of side members (18) having a cross section including two rigid and substantially parallel side walls (42); defining a space therebetween plastic means (22) extending between said plurality of side members (18) over said predetermined area (12) for covering said predetermined area (12);

cap means (24) for securing said plastic means (22) to said frame means (16), said cap means (24) including an outwardly directed face (26) and an inwardly directed face (28), said cap means 29) further including two parallel arms (30,32) having distal ends (34,36) and extending perpendicularly from said inwardly directed face (28), said assembly characterized by each of said two substantially parallel side walls (42) including an inwardly extending portion extending toward an outwardly extending portion extending back away from the other of said two substantially parallel side walls (42) to define indent means (44,46) directed inwardly for securing portions of said cap means (24) and said plastic means (22) within said space between said side walls (42).

2. An assembly (10) as set forth in claim 1 further characterized by each of said outwardly extending portions terminating in rolled ends (52, 54) to prevent tearing of said plastic means (22).

3. An assembly (10) as set forth in claim 2 further characterized by securing means (38, 40) fixedly secured to said distal ends (34, 36) of said two parallel arms (30, 32) for removably locking said cap means (24) to each of said plurality of side members (18).

4. An assembly as set forth in claim 3 further characterized by said securing means (38, 40) comprising two detents (38, 40) each disposed adjacent one of said distal ends (34, 36) of said two parallel arms (30, 32) wherein said detents (38, 40) secure said cap means (24) on each of said plurality of side members (18).

5. An assembly as set forth in claim 4 further characterized by said plastic means (22) including a plurality of plastic sheets (22).

6. An assembly as set forth in claim 5 further characterized by said plurality of plastic sheets (22) being transparent.

7. An assembly as set forth in claim 6 further characterized by said frame means including a plurality of frames (16) constructed from said plurality of side members (18).

8. An assembly as set forth in claim 7 further characterized by said two substantially parallel side walls (42) being connected by a cross member (56).

9. An assembly as set forth in claim 8 further characterized by each of said plurality of side members (18) being substantially U-shaped in cross section.

10. An assembly as set forth in claim 9 further characterized by attachment means (58) for fixedly attaching said plurality of frames (16) together to form said housing means (14).

11. An assembly as set forth in claim 10 further characterized by sealing means (66) for sealing said plurality of frames (16) together such that no contaminants may enter said housing means (14).

12. An assembly as set forth in claim 11 further characterized by said sealing means (66) comprising an adhesive tape having a width wherein half of the width of said adhesive tape (66) is secured to one of said plurality of side members (18) used to make one of said plurality of frames (16) and the remaining half of said adhesive tape (66) is secured to another of said plurality of side members (18) used to make another of said plurality of frames (16).

* * * * *